3,223,668
PHENOL-ALDEHYDE, DICYANDIAMIDE
BINDER COMPOSITION
Joseph P. Stalego, Newark, Ohio, assignor to Owens-Corning Fiberglas Corporation, a corporation of Delaware
No Drawing. Filed Apr. 23, 1962, Ser. No. 189,319
5 Claims. (Cl. 260—29.3)

This invention relates to a binder composition, and, more particularly to a hardenable binder composition containing a phenolic resin and monomeric dicyandiamide which composition is especially adapted for use with glass or other vitreous fibers.

Wool-like and board-like masses of intermeshed glass and other vitreous fibers have been manufactured extensively heretofore. In their production, fibers of glass or other vitreous materials are made by drawing or flowing streams of a fused, vitreous material through comparatively small diameter orifices, and accelerating the streams exiting from the orifices to cause attenuation thereof to a desired average fiber diameter. The resulting fibers then are associated with a hardenable binder composition, usually a phenol-formaldehyde partial condensation product, and projected onto a foraminous conveyor where intermeshed fibers and associated binder are collected and subsequently heated to convert the binder composition to a hardened, infusible condition. The final heating step can be carried out while the intermeshed fibers and associated binder are compressed to a desired extent, in which case a board-like product having an apparent density as high as about 12 pounds per cubic foot can be produced. If no pressure is applied during the heating step, a wool-like product having an apparent density as low as about one pound per cubic foot can be produced. Various materials of this type have been produced, and have found wide-spread commercial use as both thermal and acoustical insulating materials. The board-like products can also serve a decorative function.

Since the major portion of products of this sort is inorganic and vitreous in nature it might be assumed that such products would have excellent fire resistance. It has been found, however, that such is not the situation. The customary organic binder in these products undergoes a phenomenon which has been described as punking [1] when subjected to elevated temperatures or direct forming ether linkages, and in this matter increases resist-flame. Odors and fumes given off on thermal decomposition of the binder are offensive, and are capable of discoloring and staining. For example, malfunctions of clothes dryers and heaters have caused overheating of their fibrous glass insulations and decomposition of the binder, with generation of offensive fumes and staining and discoloring of fabrics. These characteristics of such products have deterred and limited their use in many applications where they would otherwise be ideally suited.

A phenolic resin, usually of the phenol formaldehyde type, has been the customary organic resin constituent in binders for use with glass and other vitreous fibers in such wool-like and board-like products. This phenolic resin serves to hold and lock the fibers in strands, intermeshed structures, mats, packs, boards, and the like.

Generally, a satisfactory binder composition, in addition to the organic resin constituent, contains other constituents for purposes well known in the art, as for instance to control a particular property or properties of a finished product. Such other constituents include fillers, coupling agents, lubricants, plasticizers, dyes, and the like.

The present invention is based upon the discovery that dicyandiamide is a highly useful and beneficial constituent for hardenable, phenolic resin binder compositions. A binder composition containing dicyandiamide is not subject to dilutability problems common with prior art binder compositions. In a hardened, cured state, the binder composition exhibits little or no odor and imparts substantially improved durability and punk resistance to wool- and board-like products. Apparently, upon curing or hardening of the binder composition, the dicyandiamide functions as a cross-linking agent for the hardenable phenolic resin by reacting with methylol groups without forming ether linkages, and in this matter increases resistance to thermal decomposition. During curing, the dicyandiamide may also react with any free formaldehyde present, and in this manner significantly lower the odor level of the final products. A relatively large proportion of dicyandiamide can be introduced into the binder composition by comparison with the proportion which can be introduced in the form of a dicyandiamide-formaldehyde condensation product. In addition, all steps necessary to prepare a suitable combined form of dicyandiamide for introduction into the binder composition are avoided. The discovery provides a process of great versatility and flexibility in that binder compositions containing various ratios of dicyandiamide to phenolic resin are readily obtained by simply varying the amount of monomeric dicyandiamide introduced.

It is, therefore, an object of the invention to provide an improved phenolic binder composition.

It is another object of the invention to provide a method for producing an improved phenolic binder composition.

It is a further object of the invention to provide an improved hardenable phenolic binder composition for use with glass or other vitreous fibers, and which includes dicyandiamide.

It is a further object of the invention to provide a method for producing a mass of intermeshed glass or other vitreous fibers bonded and locked together at points of contact by an improved, cured, and hardened phenolic binder composition, which in an uncured state contained dicyandiamide.

Other objects and advantages will be apparent from the description which follows, which is intended only to illustrate and disclose the invention, and in no way to constitute a limitation thereon.

According to the invention an improved heat-hardenable phenolic resin binder composition is provided. Such a composition has a solids content from about 1% [2] to about 50%, and preferably a solids content from about 3% to 30%, and is an aqueous dispersion consisting essentially of a hardenable phenolic resin and from about 10 to 120 parts of dicyandiamide for each 100 parts of the phenolic resin on a dry solids basis. The exact proportion of dicyandiamide to be employed is determined by the particular properties desired in the product and end-

---

[1] The term "punking" is used herein, and in the art, to refer to comparatively rapid oxidation of the binder, with generation of heat, but without flame.

[2] The terms "percent" and "parts" are used herein, and in the appended claims, to refer to percent and parts by weight, unless otherwise indicated.

application in which the binder is used. In general, the larger the amount of dicyandiamide in the composition, the better the punk resistance, the lower the odor of the cured product, and also the less offensive its heat-decomposition products. With binder compositions in which the amount of dicyandiamide about equals or exceeds the amount of phenolic resin, generally it is desirable to use the composition shortly after its preparation, as, otherwise, heating is required to avoid a noticeable separation of the dicyandiamide from the composition. Preferably, the binder composition contains from about 15 to about 85 parts of dicyandiamide for each 100 parts of the heat-hardenable phenolic resin.

The hardenable phenolic resin is one selected from the group consisting of phenol-formaldehyde partial condensation products and phenol-amino compound-formaldehyde condensation products, and is of a phenolic resole type. Such phenolic resoles are known to the art. In general, a phenolic resole is produced in the presence of a basic catalyst by reaction in an aqueous system of more than one mol of formaldehyde per mol of phenol. A detailed discussion of resoles can be found in The Chemistry of Phenolic Resins, Robert W. Martin, John Wiley & Sons, Inc., New York, New York, 1956 (see in particular pages 88–99, and cited references). In general, phenol-amino compound-formaldehyde condensation products are produced by an aqueous alkaline condensation of phenol and formaldehyde to produce a mixture consisting essentially of phenol alcohols. After adjustment of this phenol alcohol mixture to a pH such as to minimize further condensation of the phenol and formaldehyde, melamine or another amino-resin-former is added and the resulting reaction mixture heated to condense the melamine or other like amino compound with the phenol alcohols and any unreacted formaldehyde. The condensation conditions must be sufficient to effect an appreciable condensation of the melamine or other like amino compound, yet the phenol-amino compound-formaldehyde condensation products, so produced, should be of a state of condensation that they exhibit a high water tolerance. Where punking resistance is a highly important property, a comparatively high water tolerance is desirable, as preferably one employs a relatively dilute binder composition in order to avoid using an excessive amount of the binder. The identity of the particular reactants and catalysts employed to produce the heat-hardenable phenolic resin appears to be of only incidental importance. In most instances, and preferably so, formaldehyde and phenol (hydroxy benzene) are used, although any aldehydes and phenols producing a hardenable phenolic resole-type partial condensation product are suitable. Such aldehydes for replacement of the formaldehyde in whole or part include: paraformaldehyde, furfural, acetaldehyde, metaldehyde, tetraldehyde, and the like. Such phenols for replacement of the hydroxy benzene in whole or part include: various cresols, xylenols, resorcinol, and the like. While melamine is frequently used as the amino-resin-former reactant, urea, thiourea, dicyandiamide, and other like amino compounds capable of condensation with phenol alcohols and formaldehyde also can be used in place of part or all of the melamine. Any of the conventionally employed basic catalysts, for example any alkali metal hydroxide, such as barium hydroxide, sodium hydroxide, etc. or alkali metal carbonates, or ammonium hydroxide, or like basic condensation catalyst may be used.

The following examples are presented solely for the purpose of illustrating and disclosing the invention.

EXAMPLE 1

A binder composition was prepared in a mixing tank provided with a propeller-type agitator, which tank was first charged with 500 gallons of water and 327 pounds of dicyandiamide crystals. The water, dicyandiamide and other ingredients, subsequently charged, were stirred constantly during the formulation of the composition. The water and dicyandiamide were heated to about 120° F. and the following constituents were then added, in the amounts and order listed: 5 gallons of 20 percent ammonium hydroxide, 0.8 pound of gamma-aminopropyl-triethoxysilane, 102 gallons of Phenolic Resin A[1], 21 gallons of a 50 percent water emulsion of mineral oil emulsified with stearic acid and ammonium carbonate, and sufficient water, about 300 gallons, to provide a formulation containing about 10 percent solids. Agitation was continued for a few minutes, after the final water addition, to assure substantial uniformity of the completed binder composition. The ratio of monomeric dicyandiamide to Phenolic Resin A was 39:61.

The binder composition produced as just described, was sprayed into a forming hood through which glass fibers were being projected onto a foraminous conveyor. The fibers were collected in the form of a randomly intermeshed wool-like mass associated with the binder composition. The relative proportion of associated binder composition was such that the binder, after cure thereof, constituted slightly in excess of 8 percent of the total wool-like mass. Cure was accomplished in an oven maintained at a temperature of about 450° F. in which the glass fiber and associated binder were exposed for about 5 minutes by passage therethrough and within which the mass was compressed sufficiently that a board-like product having an apparent density of about 11½ pounds per cubic foot, on the average, was produced. The board-like product passed a standard Fire Underwriter Laboratory Test for a fire resistant ceiling tile, while a similar board-like product produced in an identical way, only from a like binder composition from which the monomeric dicyandiamide was omitted, failed to pass this test.

Similar binder compositions were prepared in substantially the manner described in Example 1, in which the solids content and the ratio of dicyandiamide to Phenolic Resin A were varied over wide ranges. Data for a number of these binder compositions are set forth in the following Table I:

*Table I*

| No. | Binder Composition | |
|---|---|---|
| | Solids Content, Percent | Ratio of Dicyandiamide to Phenolic Resin A |
| 1A | 2.5 | 20:80 |
| 1B | 2.5 | 26:74 |
| 1C | 2.5 | 31:69 |
| 1D | 2.5 | 35:65 |
| 1E | 2.5 | 39:61 |
| 1F | 41 | 15:85 |
| 1G | 41 | 31:69 |
| 1H | 41 | 35:65 |
| 1J | 41 | 39:61 |

No difficulty was encountered in the preparation of these binder compositions whether the aqueous dicyandiamide solution was mixed with the Phenolic Resin A or the Phenolic Resin A mixed with the dicyandiamide solution. It also was noted that no preparation difficulty was encountered using solutions of dicyandiamide dissolved in water containing dicyandiamide contents ranging from 15 to as high as 65 percent. Thin films of each of these binder compositions were cured on glass slides at cure

[1] Phenolic Resin A was a phenol-formaldehyde partial condensation product produced from 180 parts of formalin (a 37 percent water solution of formaldehyde), 100 parts of phenol, and 4 parts of sodium hydroxide. The starting materials were mixed in a suitable vessel, allowed to stand at room temperature (about 70° F.) for approximately 16 hours and heated at a progressively increasing temperature which was sufficient to maintain general boiling thereof. Heating was discontinued when the temperature of the reaction mixture reached approximately 180° F. Sodium hydroxide in the reaction mixture was then neutralized with phosphoric acid; the resulting neutralized phenolic resole was filtered; and the water content was adjusted to provide an aqueous solution of 50 percent solids.

temperatures between 425 to 500° F., with cure times from 1 to 8 minutes. Each of the hardened cured films of these binder compositions was examined by an expert and found to be of such a nature that it would provide an acceptable cured binder for glass and other vitreous fibers.

Small samples of unbonded glass fiber mat were dipped in binder compositions 1A, 1B, 1C, 1D and 1E, and drained. Some of the samples were then cured at 500° F. for 1½ minutes and others at 500° F. for 3½ minutes. Each sample, after curing of the binder, was placed on a hot plate at a temperature of 550° F., with a tubular chimney encircling each of the samples. Odors at the chimney tops originating from the samples were compared and evaluated after 10 and 15 minutes. The odors observed were relatively inoffensive and ranged from sweet to a mild stinging odor. In no instance was the odor observed as offensive or as strong and stinging as that from a similar mat made from a like binder from which dicyandiamide was omitted.

Small samples of unbonded glass fiber mat were also dipped in binder compositions 1F, 1G, 1H and 1J, drained, and cured at 500° F. for 3½ minutes. When examined at ambient conditions, the resulting bonded mat samples appeared to be substantially free from odor. Corresponding bonded mat samples produced with the same binders, except that the dicyandiamide was omitted had, at ambient conditions, a faint but detectable odor, indicative of free formaldehyde. A comparison of the flow, stroke cure, and cone efficiency properties of binder compositions 1F through 1J with those of like binder compositions from which the dicyandiamide was limited showed, within about ±5 percent, substantially equivalent properties for all of these compositions.

Additional binder compositions were prepared in substantially the manner set forth in Example 1, in which the ratio of dicyandiamide to Phenolic Resin A was varied over wide ranges. A "Shell Mold Test"[1] was used to evaluate the strength properties of these binders compositions. Table II, which follows, tabulates data on these compositions and results of these tests, and, for comparison purposes, includes data of a representative, similar, binder composition from which the dicyandiamide was omitted.

---

[1] The "Shell Mold Test" involved diluting the binder composition to 40 percent solids, and then mixing 45 grams thereof with 582 grams of small soda lime glass beads to produce a shell molding composition. Portions of this shell molding composition were then placed in a heated "dog-bone shaped" shell pattern, and the pattern containing the dog-bone-shaped molding composition was placed in a heated oven for cure of the composition. After cure, and separation from the pattern, the shell moldings were tested for tensile strength, as molded, and after heating in a humid atmosphere. While strength measurements made from duplicate shell moldings vary to some extent, possibly as much as 20 percent, it has been found that such strength measurements are reasonably accurate and do provide a good and satisfactory basis for comparison and evaluation of various resins and binder compositions as to their usefulness with fibrous glass to prepare bonded mat and the like.

EXAMPLE 2

A binder of the following composition was prepared in substantially the manner described in Example 1:

Water _____ gallons__ 955
Dicyandiamide _____ pounds__ 80
28 percent ammonium hydroxide _____ gallons__ 5
Gamma-aminopropyltriethoxysilane _____ pounds__ 0.2
Ammonium sulfate _____ do____ 1.75
Phenolic Resin A, 40 percent solids _____ gallons__ 40

This binder composition had a solids content of 2.7 percent and the ratio of dicyandiamide to Phenolic Resin A was 35:65.

This binder composition was employed to produce thermal insulating "wool" and board in substantially the manner described in Example 1. Fine "wool" glass fibers were used. These fibers were produced by attenuation of primary filaments by means of a horizontally directed blowing burner. The fibers were projected horizontally with a spray of the binder composition; fibers and binder were deposited and collected on a moving foraminous conveyor. Cure of the binder in this deposited mass was in an oven at about 425° F. for about 4 minutes.

Typical properties of 2 inch nominal thickness insulating board produced using this binder composition are reported in the following Table III. Comparative properties of a similar commercially available insulating board also are included. The commercially available board was produced from a binder composition containing no dicyandiamide.

Table III

| Property | Insulating Board of Example 3 | Commercially Available Insulating Board [1] |
|---|---|---|
| Fiber Index | 25 | 27 |
| Fire Resistance | (2) | (3) |
| Compressive Strength As Prepared: | | |
|   Load (p.s.f.) to compress to 40% thickness | 583 | 467 |
|   Thickness recovery upon release of load (percent) | 99 | 99 |
| After 1 Hour Exposure in Steam Autoclave: | | |
|   Load (p.s.f.) to compress to 40% thickness | 500 | 377 |
|   Thickness recovery upon release of load | 99 | 95 |
| Density (p.s.f.) | 3.01 | 2.81 |
| Ignition Loss (percent) | 24.3 | 15.3 |
| Parting Strength (lbs./gm.): | | |
|   As prepared | 3.84 | 2.81 |
|   After 1 hour exposure in steam autoclave | 3.52 | 1.98 |
| Swelling (percent) [4] | 1.5 | 2.4 |
| Moisture Absorption (percent) [4] | 0 | 0 |

[1] This commercially available insulating board differed from the board of Example 3 chiefly in that it was produced using a binder composition which contained a deionized phenol-formaldehyde-melamine condensation product, and did not contain dicyandiamide.
[2] No punking after 15 minutes on a hot plate at 500° F.; no smoldering.
[3] Punking after 5 minutes on a hot plate at 500° F.; no smoldering.
[4] After exposure to 95 percent relative humidity for 96 hours at 120° F

Table II

| No. | Ratio of Dicyandiamide to Phenolic Resin A | Cure Conditions | | Strength | | |
|---|---|---|---|---|---|---|
| | | Temperature (° F.) | Time (minutes) | Wet Break (p.s.i.) [1] | Dry Break (p.s.i.) [2] | Strength Retention |
| A | 20:80 | 425 | 7 | [3] 796 | [3] 908 | 88 |
| B | 30:70 | 425 | 7 | 864 | 876 | 99 |
| C[1] | 35:65 | 425 | 7 | 720 | 856 | 84 |
| C[2] | 35:65 | 425 | 8 | 720 | 832 | 87 |
| D[1] | 40:60 | 425 | 8 | 732 | 788 | 93 |
| D[2] | 40:60 | 500 | 7 | 576 | 720 | 80 |
| E | 45:65 | | 8 | 388 | 520 | 75 |
| F | 50:50 | 500 | 7 | 624 | 704 | 88 |
| Comparison | 0:100 | 425 | 7 | 688 | 744 | 92 |

[1] Conditioned at a temperature of 122° F. and a relative humidity of 100% for 16 hours.
[2] As molded.
[3] Average of at least two tests.

EXAMPLE 3

A binder composition was prepared as follows: a mixing tank, provided with a propeller-type agitator, was charged with 300 gallons of water. The water was warmed and 315 pounds of dicyandiamide crystals were added thereto and dissolved therein. After cooling of the resulting solution to ambient temperature, about 70° F., the following ingredients, in the amounts and order as listed, were added and mixed therewith, with constant agitation: 1.37 pounds of gamma-aminopropyltriethoxysilane, 15.3 pounds of ammonium sulfate, 8 gallons of 28 percent ammonium hydroxide, 292 gallons of Phenolic Resin B [1], and 400 gallons of water. This completed binder composition amounted to approximately 1000 gallons and had a solids content of about 16 percent. The ratio of dicyandiamide to phenolic Resin B was 23:77.

Preformed glass wool thermal insulation was produced with the above binder composition in a conventional manner on commercial production equipment and tests were made of the thermal insulation. Like tests, for comparative purposes, were made on a commercial preformed glass wool produced in the same manner on the same equipment except that its binder composition contained a hardenable melamine-phenol-formaldehyde resin. Table IV, which follows, sets forth the data.

Table IV

| Property | From binder composition of Example 3 | From binder composition containing melamine-phenolic-formaldehyde resin |
|---|---|---|
| Density, p.c.f. | 5.9 | 6.7. |
| Ignition Loss, percent | 6.7 | 8.4. |
| Thickness, inches | 1.04 | 0.97. |
| Fiber Index | 51 | (32 H.T.-Diameter). |
| Punking-500° F. plus hot probe: At 2″ thickness | No punking | Complete punking. |
| Weight loss, percent | 0.7 | |

---

[1] Phenolic Resin B was a melamine-phenol-formaldehyde partial condensation product produced from 58 parts of phenol, 123.4 parts of formalin (a 37 percent solution of formaldehyde in water), and 12 parts of barium hydrate $(Ba(OH)_2 \cdot 8H_2O)$. The starting materials were mixed in a suitable vessel and heated while constantly stirred by a propeller-type agitator. The charge first was heated to 110° F. and maintained at this temperature for approximately 3 hours, then heated to and held at 120° F. for 5 hours, and then heated to and held at 140° F. for 2 hours. At this time the reaction mixture had a refractive index of 1.4620 and an infra-red absorption analysis thereof indicated that it was substantially free of unreacted phenol and also of methylene groups. The reaction mixture had a free formaldehyde content of approximately 3.6 percent. The reaction mixture was then cooled to approximately 100° F., and neutralized with sulfuric acid to a pH of about 7.5. A 23.2 part charge of melamine then was added and the resulting mixture, while agitated, was heated to and maintained at approximately 140° F. for an additional 2 hour period. The reaction products were then cooled to approximately 75° F., and neutralized with further sulfuric acid to a pH of approximately 7.2. The reaction products had a free formaldehyde content of approximately ½ percent. Substantially all of the barium hydroxide catalyst was precipitated as barium sulfate, and the final product was substantially free of soluble ions. This final product was then diluted with water to 40 percent solids.

---

Excellent binder compositions and results have also been achieved using dicyandiamide and other heat-hardenable phenolic resins instead of Phenolic Resins A and B. For example, substituted melamines can be used in place of at least a part of the melamine as a reactant in producing a useful binder constituent of the nature of Phenolic Resin B; also dicyandiamide urea borate, guanidine, and urea have been used in place of at least a part of the melamine, and the resulting heat-hardenable phenolic resins have been found to be suitable binder constituents. The proportion of dicyandiamide mixed with such heat-hardenable resins has been varied over wide ranges, and the resulting binder compositions and bonded mats and insulation produced therefrom have been found to be excellent. In general, the procedures set forth in the preceding examples were followed in producing such binder compositions and bonded products.

Table V, which follows, sets forth additional examples of binder compositions.

Table V

| Example No. | 4 | 5 | 6 | 7 | 8 |
|---|---|---|---|---|---|
| Binder Composition: | | | | | |
| Water | 300 gal | 500 gal | 500 gal | 300 gal | 100 gal. |
| Dicyandiamide, 100% solids | 22 lb | 81.3 lb | 81.3 lb | 171 lb | 27 lb. |
| Ammonium hydroxide (28 percent) | 4 gal | 6 gal | 6 gal | 19 gal | |
| Gamma-aminipropyltriethoxysilane | 0.4 lb | 0.31 lb | 0.31 lb | 1.4 lb | 0.6 lb. |
| Ammonium sulfate, 100% solids | 22 lb | 1 lb | 1 lb | 9.0 lb | |
| Vinsol, 40% solids [1] | | | | 74 gal | |
| Phenolic Resin A, 50% solids | 83.6 gal | 25.4 gal | 25.4 gal | | 7.1 gal. |
| Phenolic Resin C, [4] 50% solids | | | | 268 gal | |
| Mineral oil emulsion, 50% solids | 16.5 gal | 5.25 gal | 5.25 gal | 44 gal.[2] | 2.4 gal. |
| Dye, 100% solids | 2.6 lb | | | | |
| Water | 596 gal | 850 gal | 421 gal | 266 gal | ([3]) |
| Total solids, percent | 6 | 2 | 3 | 22 | 3. |
| Ratio of dicyandiamide to phenolic resin | 5:95 | 39:61 | 39:61 | 11:89 | 43:57. |
| Type of bonded product produced | Building insulation. | Appliance insulation. | Appliance insulation. | Heavy density insulation. | Appliance insulation. |

---

[1] "Vinsol" is the residue left after rosin and turpentine distillation of the extract from the heartwood of southern pine stumps which have been left after a lumbering operation and several years seasoning. This residue is a hard, friable, high melting (above 190° F.) natural thermo-plastic resin. Its chemical composition is a complex mixture of chemically uncharacterized resinous components which include phenols, phenol ethers, and polyphenols. The approximate composition is as follows:
 6% High melting furfural condensate
 4% Neutral oils (hydrocarbons, esters and ethers carrying the vinsol odor)
 9% Rosin (approximate old quality FF)
 5% Belro-Phenol-lactone (probably $C_{18}H_{14}O_{3.2}(OCH_3OH)$)
 5% Flavene type polyphenol (possibly $C_{15}H_7O_2OH$)
 2% Humic acid type compounds
 0.2% Pectic acid type compounds
 6% Air oxidized rosin acids
 3% Strongly acidic compounds
 38% Weakly acidic, high melting phenolic compounds
 19% Relatively neutral phenol ethers and esters
 1% Water soluble carbohydrates, etc.
[2] 40% solids.
[3] Sufficient water to make 250 gallons of binder composition.
[4] Phenolic Resin C was similar to Phenolic Resin B, except that dicyandiamide was substituted for the melamine.

What I claim is:

1. A hardenable phenol-aldehyde resin binder composition, which is an aqueous dispersion containing from about 1 to about 50 percent of solids consisting essentially of a heat-hardenable phenol-aldehyde resin having no more than about 3.6 percent by weight of free aldehyde, and from about 10 to 120 parts by weight of unreacted dicyandiamide for each 100 parts of the hardenable phenol-aldehyde resin, on a dry solids basis.

2. A heat-hardenable, aqueous binder composition for glass and other vitreous fibers, which composition contains from about 3 to 30 percent by weight of solids consisting essentially of unreacted dicyandiamide and a phenol-aldehyde resole in a ratio of from 15 to 85 parts by weight of unreacted dicyandiamide to each 100 parts of the phenol-aldehyde resole, said resole having no more than about 3.6 percent by weight of free aldehyde.

3. A method of preparation of a hardenable aqueous binder composition for glass and other vitreous fibers, which method comprises: dissolving from about 10 to 120 parts of monomeric dicyandiamide in water at a sufficiently elevated temperature to dissolve said unreacted dicyandiamide, and mixing the resulting solution with other constituents making up the composition, the other constituents including 100 parts by weight of at least one heat-hardenable phenol-aldehyde resin from the group consisting of phenol-formaldehyde partial condensation products and phenol-amino compound-formaldehyde condensation products, which condensation products have less than about 3.6 percent by weight of free aldehyde.

4. A method for producing a mat of bonded, intermeshed vitreous fibers, which includes the steps of: introducing a heat-hardenable phenol-aldehyde resin binder composition into a fluid mass of vitreous fibers which are being projected towards a collecting surface, the heat-hardenable phenol-aldehyde resin binder composition being an aqueous dispersion of from about 1 percent to about 50 percent solids consisting essentially of heat-hardenable partial phenol-formaldehyde condensation products having no more than about 3.6 percent by weight of free formaldehyde and from about 10 to 120 parts of unreacted dicyandiamide for each 100 parts of the heat-hardenable phenol-formaldehyde condensation products on a dry solids basis; depositing the projected fibers in association with the heat-hardenable phenol-aldehyde resin binder composition in a wool-like mass; and heating the mass of fibers and the binder composition associated therewith to convert the latter to a hardened, cured composition.

5. A mass consisting essentially of intermeshed glass fibers having associated therewith the heat-hardenable, aqueous binder composition of claim 1.

References Cited by the Examiner

UNITED STATES PATENTS

| | | | |
|---|---|---|---|
| 2,690,393 | 9/1954 | McGarvey | 117—126 |
| 3,004,941 | 10/1961 | Mestdagh et al. | 260—29.3 |

LEON J. BERCOVITZ, *Primary Examiner.*

DONALD E. CZAJA, *Examiner.*